United States Patent [19]

Streeter et al.

[11] Patent Number: 4,590,240
[45] Date of Patent: May 20, 1986

[54] THIOETHER-MODIFIED SEALANT COMPOSITIONS

[75] Inventors: Bruce E. Streeter, Morrisville; John H. MacMillan, Ambler; Eugene R. Bertozzi, Yardley, all of Pa.

[73] Assignee: Morton Thiokol, Inc., Chicago, Ill.

[21] Appl. No.: 685,601

[22] Filed: Dec. 27, 1984

Related U.S. Application Data

[63] Continuation of Ser. No. 590,536, Mar. 19, 1984, abandoned, which is a continuation of Ser. No. 387,626, Jun. 11, 1982, abandoned.

[51] Int. Cl.$^4$ ................................................ C08F 8/36
[52] U.S. Cl. ..................................... 525/123; 525/350
[58] Field of Search ................ 525/123, 130, 131, 350

[56] References Cited

U.S. PATENT DOCUMENTS

| | | | |
|---|---|---|---|
| 3,028,367 | 4/1962 | O'Brien | 525/123 |
| 3,265,671 | 8/1966 | Mahan et al. | 525/350 |
| 4,246,369 | 1/1981 | McGinniss et al. | 525/350 |

*Primary Examiner*—Lewis T. Jacobs
*Assistant Examiner*—Robert E. L. Sellers, II
*Attorney, Agent, or Firm*—Richard J. Sheridan; Gerald K. White

[57] ABSTRACT

A window sealant formulation comprising a partially saturated alkanethiol adduct of polybutadiene or polyisoprene is disclosed. The window sealant exhibits good thermal stability, low water vapor transmission rate, non-sulfurous odor, low volatility, and acceptable elongation.

3 Claims, No Drawings

THIOETHER-MODIFIED SEALANT COMPOSITIONS

This is a continuation of co-pending application Ser. No. 590,536 filed on Mar. 19, 1984, now abandoned, which is in turn a continuation of Ser. No. 387,626, filed June 11, 1982, now abandoned.

BACKGROUND OF THE INVENTION

This invention relates to thioether-modified polymeric compositions which are particularly suitable for use as sealants for insulating glass.

The term "insulated glass" broadly refers to a structure comprising panes of glass, the faces of which are in spaced relationship, thereby providing between the glass panes a space which imparts insulating properties to the structure. In its most widely used form, two parallel panes of glass are positioned in spaced relationship by metallic spacers positioned around the perimeters of the panes, and indented a short distance from the edges of the panes, thereby forming a U-shaped channel in which the legs of the U comprise the interior surface edges of the panes and the base of the U comprises a side of the spacer. Typically, the spacer is a hollow member filled with a water absorbent material, for example, a molecular sieve, to keep the enclosed air space between the glass panes dry. In such a structure, the aforementioned U-shaped channel is filled with a sealant, generally a polymeric composition, which must have a certain combination of properties for satisfactory use.

The sealant must have a very low water vapor transmission (WVT) rate so that moisture is prevented from entering the dry space between the panes of glass. The presence of moisture in the space tends to reduce the insulating value thereof. Moisture in the space can also condense on the panes of glass and create visibility or aesthetic problems. If the sealant does not have a satisfactory low WVT rate, the capacity of the water-absorbent material in the hollow spacer will be exceeded, and moisture will find its way into the space.

The sealant should be thermally stable and form an excellent bond with glass which is not degraded over long periods of time under normal conditions of use, which generally include exposure to sunlight, moisture, and large changes in temperature.

Furthermore, the sealant itself should not be a source of material which enters the space between the panes of glass. Should one or more constituents comprising the sealant volatize into the space, fogging, often referred to as "chemical fogging," of the glass panes may result.

Temperature variation will tend to cause contraction and expansion of the insulated glass structure. Therefore, the sealant should have an elongation of at least 100%, and preferably an elongation of at least 200%.

The sealant should also resist degradation due to contact with conventional caulks and putties.

At present, the most widely used insulated glass sealants are prepared from polysulfide liquid polymers, selected plasticizers, and glass adhesion promoters such as silanes. Generally, polysulfide type sealant is applied in liquid form and then cured by the use of a curing agent such as manganese dioxide.

F. Wilson, "Insulated Glass And Sealant Therefore," U.S. Pat. No. 4,153,594 (May 8, 1979) discloses polyurethane sealants prepared from a hydroxyl-terminated polybutadiene prepolymer and certain plasticizers.

C. Fryling, "Plasticizing Synthetic Rubber With A Reaction Product Of An Alkanethiol And A Rubbery Diolefin Polymer," U.S. Pat. No. 2,543,844 (March 1951) teaches the use of alkanethiol butadiene styrene adducts as plasticizers to increase the tack and decrease the hardness of synthetic rubber.

G. Serniuk, "Thioglycollic Acid Adducts Of Rubberlike Polymers And Process Of Preparing Same," U.S. Pat. No. 2,589,151 (Mar. 11, 1952) discloses that hydrocarbon solvent resistance of polybutadiene is improved by partially saturating the double bonds of the polymer with thioglycollic acid. The polythioether adduct so prepared is insoluble in benzene, benzene/isopropyl alcohol, naptha, and carbon tetrachloride.

P. Warner, "Method Of Preparing Sealants From Polybutadiene And Mercapto Hydroxy Compounds," U.S. Pat. No. 3,689,450 (Sept. 5, 1972) teaches that mercaptohydroxy polybutadiene adducts cured with sulfur or sulfur donor compounds are thermally stable when exposed to ultraviolet light at 140° F. and 50% relative humidity.

While the addition of alkanethiol to diene polymers is known to result in enhanced chemical properties such as thermal stability, solvent resistance, and oxidation resistance, attempts to commercialize these thioether-modified diene polymers and copolymers as sealant compositions have failed due to the objectionable odors these compounds give off.

DESCRIPTION OF THE INVENTION

The applicants' invention is a composition comprising the reaction product of (a) the addition reaction product of an unsaturated polymer and an alkanethiol of from 8 to 20 carbon atoms, and (b) a curing agent.

The applicants have discovered that addition of alkane thiol to the double bonds of the unsaturated polymeric backbone significantly improves the thermal stability and lowers the water vapor transmission of unsaturated polymer-based sealants without imparting the objectionable sulfurous odor commonly associated with thiol-modified compounds. The water vapor transmission of the novel sealant composition is typically 75% of conventional polybutadiene sealants. Thermal stability increases with increasing alkanethiol saturation, but cost and viscosity considerations limit practical saturation levels from 5 to 30 mole percent.

The term "unsaturated polymer" means an organic molecule possessing a molecular weight of from 500 to 5000, and which is composed of at least one monomer which contains at least one carbon to carbon double bond. Various unsaturated polymers may be employed in the preparation of the applicants' compounds. Suitable polymers include polybutadiene and polyisoprene. They may be prepared by free radical addition polymerization of their respective monomers, 1,3-butadiene, and 2-methyl-1,3-butadiene. Hydroxyl-terminated polybutadiene is commercially available as ARCO ®R45M from the Arco Chemical Company, 1500 Market Street, Philadelphia, Pa. 19101.

Alkanethiols of from 8 to 20 carbon atoms may be employed in the practice of the applicants' invention. They may be straight chain or branched. Suitable compounds include n-octanethiol, n-dodecanethiol, tert-dodecanethiol, and eicosanethiol.

The choice of specific alkanethiol has a significant effect on the final, cured sealant composition. Using polybutadiene, saturation levels of ninety percent were achieved with methanethiol with an optimal saturation level of seventy percent. However, lower alkanethiols (such as methanethiol, ethanethiol, and propanethiol) produce cured insulating glass sealants which give off objectionable sulfurous odors.

Alkanethiols of from eight to twenty carbon atoms are required due to the odor problem created by use of lower alkanethiols. A further advantage of higher alkanethiols is that lower saturation levels are adequate to impart significantly lower WVT and improved thermal stability to cured composition. For example, ARCO ®R45M polybutadiene with a 5 mole percent dodecanethiol saturation level which has been cured with toluene diisocyanate has a permeability of 0.026 grams of water per 24 hours per square meter of sealant per mm Hg differential per centimeter of sealant thickness and retains its elasticity, suffering only slight discoloration after 24 hours at 150° C. in air. This is in contrast to conventional polybutadiene, cured with toluene diisocyanate, which possesses a permeability of 0.031, and which becomes brittle and inelastic after 24 hours of exposure to air at 150° C. Polybutadiene which has been partially saturated (66%) with mercaptoethanol, and then cured with sulfur, has a permeability of 0.048. After exposure to air at 150° C. for 24 hours, the mercaptoethanol-modified, sulfur cured polybutadiene darkened and became brittle.

A small amount of catalyst may be employed in the alkanethiol addition reaction. Suitable catalysts include azobisisobutyronitrile, benzoyl peroxide, acetyl peroxide, di-tert-butyl peroxide, dicumyl peroxide, and tert-butyl hydroperoxide.

The thiol addition reaction may be run at a temperature range of from about 60° to 100° C. The reaction is run in the absence of oxygen by blanketing the reactants with nitrogen. The thiol group adds to the carbon to carbon double bond, forming a thioether linkage.

The specific curing agent employed is not critical to the practice of the applicants' invention. Selection of the class of curing agent (polyamine, polyol, polyisocyanate, etc.) is dependent upon the terminal functional groups of the unsaturated polymer. For example, if the unsaturated polymer has terminal hydroxyl groups, a polyisocyanate curing agent may be employed. If the unsaturated polymer has terminal carboxylic groups, polyepoxide curing agents may be employed. If the unsaturated polymer has amine terminal groups, polyisocyanate, polyepoxide and anhydride curing agents may be employed.

The polyisocyanate curing agent for use in the practice of the applicants' invention is any compound which contains two or more isocyanate groups in the molecule. The polyisocyanate can be an aliphatic or aromatic polyisocyanate including, for example, cycloaliphatic, aryl, aralkyl, and alkaryl polyisocyanates.

Examples of aliphatic polyisocyanates which can be used are: ethylene diisocyanate, trimethylene diisocyanate, tetramethylene diisocyanate, etc; other alkylene diisocyanates such as propylene-1,2-diisocyanate, butylene-1,2-diisocyanate, butylene-1,3-diisocyanate, butylene-2,3-diisocyanate, etc; alkylidene diisocyanates, such as ethylidene diisocyanate, butylidene diisocyanate, etc.; cycloalkylene diisocyanates, such as cyclopentylene-1,3-diisocyanate, cyclohexylene-1,4-diisocyanate, 4,4'-diisocyanato bis(cyclohexyl)methane, etc.; p-phenylene-2,2'-bis(ethyl isocyanate); p-phenylene-4,4'-bis(butyl isocyanate); m-phenylene-2,2'-bis(ethyl isocyanate); 1,4-naphthalene-2,2'-bis(ethyl isocyanate); 4,4'-diphenylene-2,2'bis(ethyl isocyanate); 4,4-diphenylene ether-2,2'-bis(ethyl isocyanate); tris (2,2',2"-ethyl isocyanate benzene); 5-chloro phenylene-1,3-bis(propyl-3-isocyanate); 5-methoxy phenylene-1,3-bis(propyl-3-isocyanate); 5-cyano phenylene-1,3-bis(propyl-3-isocyanate); and 5-methyl phenylene-1,3-bis(propyl-3-isocyanate).

Examples of aromatic polyisocyanates which can be used include: tolyene diisocyanate; m-phenylene diisocyanate; p-phenylene diisocyanate; 1-methyl-2,4-phenylene diisocyanate; naphthylene-1,4-diisocyanate; diphenylene-4,4'-diisocyanate; xylylene-1,4-diisocyanate; xylylene-1,3-diisocyanate; and 4,4'-diphenylenemethane diisocyanate.

The polyepoxide curing agent for use in the practice of the applicants' invention is any compound which contains two or more epoxy groups in the molecule. Suitable polyepoxides include 1,3-butadiene diepoxide, 1,4-butanediol diglycidyl ether, 1,2, 7,8-diepoxyoctane, and 1,2,5,6-diepoxycyclooctane.

The anhydride curing agent must be a cyclic anhydride. Suitable anhydrides include butanedioic acid anhydride (succinic anhydride), methylbutanedioic acid anhydride, 2-dodecen-1-ylbutanedioic acid anhydride, pentanedioic acid anhydride (glutaric anhydride), 3-methylpentanedioic acid anhydride, 3-ethyl-3-methylpentanedioic acid anhydride, 3,3-dimethylpentanedioic acid anhydride, 2,2-dimethylpentanedioic acid anhydride, 2-phenylpentanedioic acid anhydride, 1,2-benzenedicarboxylic acid anhydride (phthalic anhydride), 2,3-pyridinedicarboxylic acid anhydride, 1,8-napthalenedicarboxylic acid anhydride, 2-butenedioic acid anhydride (maleic anhydride), 2,3-dimethyl-2-butenedioic acid anhydride, and 2-ethyl-2-butenedioic acid anhydride. Dianhydrides may also be employed as the anhydride curing agent. Suitable dianhydrides include 1,2,3,4-benzenetetracarboxylic acid dianhydride, 3,3',4,4'-benzophenonetetracarboxylic acid dianhydride, and 1,4,5,8-napthalenetetracarboxylic acid dianhydride.

The polyamine curing agent for use in the practice of the applicant's invention is any compound which contains two or more primary amine groups in the molecule. Suitable polyamine curing agents include ethylene diamine, propylene diamine, hexamethylene diamine, and bis(p-aminocyclohexyl) methane.

Cure of the thioether-modified polymer may be achieved by thoroughly mixing the adduct with the curing agent and subjecting the composition to a temperature between 80° and 150° C. The time period required for cure will depend on the specific formulation, especially upon any cure catalysts employed.

Conventional additives may be incorporated into the insulating glass sealant formulation to achieve optimum sealant performance. Typically such additives include plasticizers, glass adhesion promoters, antioxidants, reinforcing fillers, dyes, and pigments.

Suitable plasticizers include low volatility phthalate plasticizers and chlorinated hydrocarbons. Suitable phthalates include benzyl phthalate and alkyl benzyl phthalates. Chlorinated hydrocarbon plasticizers suitable for use are paraffins or α-olefins containing from 16 to 20 carbon atoms which are chlorinated to a final chlorine content of from 52 to 58 weight percent chlorine, and blends thereof.

Suitable glass adhesion promoters are the organoalkoxysilanes such as gamma-glycidoxypropyl trimethoxysilane, gamma-aminopropyl triethoxysilane, n-bis(beta-hydroxyethyl) gamma-aminopropyl triethoxysilane, and N-beta(aminoethyl) gamma-aminopropyl trimethoxysilane. They may be incorporated in the sealant formulation in an amount ranging from 0.5 to 4 percent by weight based upon the total composition weight. Gamma mercaptopropyltrimethoxysilane is commercially available as A-189 silane from the Union Carbide Corp.

Fillers include carbon black, silica, talc, calcium carbonate, calcium oxide, titanium dioxide, zinc sulfide, calcium silicate, and hydrated aluminum. These fillers may be incorporated into the sealant formulation in an amount ranging from twenty to seventy percent by weight based upon the total composition weight.

A cure catalyst is usually incorporated into the insulating glass sealant formulation in an amount ranging from 0.5 to 1.5 percent based upon the total weight of the formulation. The amount of catalyst may be adjusted to achieve the desired work life of the insulating glass sealant formulation. By "work life" it is meant the time period commencing with mixture of all the components of the formulation and ending with the substantial cure of the formulation into a solid mass which cannot be worked any further. Suitable cure catalysts include tertiary amines such as triethylamine, diethylmethylamine, ethyldimethylamine, morpholine, piperazine, and N-ethylmorpholine. Organometallic cure catalysts such as dibutyltin oxide, dibutyltin dilaurate, stannous oleate, stannous octoate, and lead octoate may also be employed.

To prevent premature cure of the insulating window glass sealant composition the thioether-modified polymer and the curing agent may be separately packaged and mixed immediately prior to application. A two package insulating glass sealant formulation which employs an isocyanate terminated version of the applicants' thioether modified polymer is shown below:

| | Weight Percentage |
|---|---|
| PACKAGE "A" | |
| Toluene diisocyanate-terminated polybutadiene with 5 mole percent saturation using n-dodecanethiol | 34.5 |
| Essex Clay (Filler) | 34.5 |
| Chlorinated hydrocarbon plasticizer (Unichlor 5722) | 7.0 |
| PACKAGE "B" | |
| Ricinoleate polyol (POLYCIN ® 53) | 4.8 |
| Dibutyltin dilaurate (catalyst) | 1.2 |
| $CaCO_3$ (filler) | 13.9 |
| CaO (filler) | 1.7 |
| Carbon black (filler) | 0.35 |
| gamma mercaptopropyltrimethoxysilane (glass adhesion promotor) | 0.1 |
| chlorinated hydrocarbon plasticizer | 1.7 |
| | 99.75 |

The examples which follow are intended to illustrate the practice and advantages of the applicants' invention and are not intended to limit the scope of their invention in any way. All percentages are measured by total weight of the composition unless otherwise stated.

In the test method used to generate the water vapor permeability test results reported below a water filled dish covered with a cured sheet of the composition in question and sealed at the edges as described in ASTM E96-66 Method B is placed in a dessicator over anhydrous calcium chloride. The test chamber temperature is maintained at 70° F. (21.1° C.). The dish is removed from the dessicator and weighed on a daily basis. The weight loss can be used to calculate the Water Vapor Transmission, Permeance, and Permeability of the sheet.

As defined by ASTM E96-66, the "rate of water vapor transmission" (WVT) is the time rate of water vapor flow normal to the parallel surfaces of a sheet of test material under steady conditions through unit area, under specified conditions. An accepted WVT unit is 1 gram/24 hours-$m^2$.

"Water Vapor Permeance" is defined as the ratio of a test material's WVT to the vapor pressure differential between the interior of the test dish and the interior of the dessicator. An accepted unit of permeance is a metric-perm or 1 gram/24 hours-$meter^2$-mmHg.

"Water Vapor Permeability" is defined as the product of the test material's permeance and its thickness. An accepted unit of permeance is a metric perm-centimeter, or 1 gram/24 hours-$m^2$-mmHg cm.

EXAMPLE I

Addition of Methanethiol to Polybutadiene 27.0 grams (0.50 mole) of hydroxyl-terminated polybutadiene and 0.25 grams of benzoyl peroxide were dissolved in 50 milliliters of toluene in a 250 milliliter three-neck flask equipped with a thermometer and a dry ice/acetone condenser.

25.0 grams of methanethiol were cooled to 0° C. 12.5 grams were added to the reaction mixture during a three hour period with a reaction mixture temperature of 50°-56° C.

The reaction was shut down overnight. The next morning an additional 0.25 grams of benzoyl peroxide were added to the reaction mixture. The remaining methanethiol was added to the reaction mixture over the course of two hours.

The reaction mixture was held at reflux (45°-47° C.) for an additional two hours. The toluene and excess methanethiol were distilled off at atmospheric pressure until the reaction mixture temperature reached 100° C. Vacuum distillation was continued until the reaction mixture temperature reached 114° C. Sodium hydroxide and chlorox traps were used to contain an objectionable sulfurous odor given off by the product.

Product yield was 29.0 grams. Sulfur analysis was 5.47%, giving a saturation value of 10.1%.

EXAMPLE II

Addition of N-Butanethiol to Polybutadiene 121 grams (2.24 moles) of hydroxyl-terminated polybutadiene and 2.5 grams (0.015 moles) of azobisisobutyronitrile were dissolved in 200 milliliters of toluene in a one liter, three-neck flask equipped with a thermometer and an agitator. The solution was heated under nitrogen to 75°-80° C. and mixed continuously throughout the thiol addition.

100 grams (1.11 moles) of n-butyl mercaptan were added to the reaction mixture over the course of five hours. At the three hour mark an additional gram of catalyst was added, and at the five hour mark an additional half gram of catalyst was added.

The reaction mixture temperature was maintained at 75°-80° C. for approximately two hours after thiol addition was complete.

The toluene and unreacted thiol were removed by vacuum stripping. The product displayed a sulfurous odor which was somewhat reduced by adding some lead dioxide powder. Yield was 178 grams (80.5%), corresponding to a saturation level of approximately 28%. Sulfur analysis was approximately 11.31%.

EXAMPLE III

Addition of N-Dodecanethiol to Polybutadiene to Achieve A Saturation Level of 20%

230.5 grams (4.27 moles) of polybutadiene, and 8.0 grams of azobisisobutylronitrile were dissolved in 150 milliliters of toluene in a one liter, three neck flask equipped with any agitator and a thermometer. The solution was heated under nitrogen to 90°–95° C. and mixed continuously throughout the thiol addition.

173.0 grams (0.85 moles) of n-dodecanethiol were added to the reaction mixture over the course of 4 hours. An additional gram of catalyst was added at one hour intervals.

Once the thiol addition was complete, the heating was stopped overnight. The next morning heating was resumed for an additional seven hours, with additional one gram catalyst additions at the two and four hour marks.

The solvent was removed by vacuum stripping at 80° C. Product yield was 396 grams (98%).

The product had moderate viscosity and had a minimal "non-sulfurous" odor. Thiol analysis was 0.76%, corresponding to a saturation level of 18%.

EXAMPLE IV

Addition of N-Dodecanethiol to Polybutadiene to Achieve a 10% Saturation Level 234 grams (4.33 moles) of polybutadiene and 11.0 grams (0.067 moles) of azobisisobutyronitrile were dissolved in 200 milliliters of toluene in a one liter, three neck flask equipped with a thermometer and an agitator.

Using the procedure of Example III, 89 grams (0.44 moles) of n-dodecanethiol were slowly added to the reaction mixture over the course of six hours. The temperature was maintained at 95° C. for an additional seven hours. The toluene was removed by vacuum stripping.

Product yield was 321.5 grams (96.3%). The product had a mild, non-sulfurous odor. Thiol analysis was 0.01% and sulfuranalysis was 4.24%, corresponding to a saturation level of 10.0%.

EXAMPLE V

Addition of N-Dodecanethiol to Polybutadiene to Achieve 5% Saturation Level 300 grams (5.56 moles) of polybutadiene and 9 grams of azobisisobutyronitrile were dissolved in 200 milliliters of toluene in a one liter, three neck flask equipped with a thermometer and an agitator.

Using the procedure of Example III, 56 grams (0.278 moles) of n-dodecanethiol were slowly added to the reaction mixture over the course of four hours. The temperature was maintained at approximately 90° C. for an additional two hours. The toluene was removed by vacuum stripping.

Product yield was 355 grams (99.9%). The product had a mild, non-sulfurous odor. Thiol analysis as 0.02% and sulfur analysis was 2.50%, corresponding to a saturation level of 5.0%.

EXAMPLE VI

Toluene Diisocyanate Cure of N-Butanethiol Polybutadiene Adduct 60.7 grams of the adduct prepared in Example II were warmed in an oven at 100° C. to decrease viscosity, mixed with 2.85 grams of toluene diisocyanate, and poured into a six by six inch mold. The mixture was degassed under vacuum at approximately 80° C. Difficulty was experienced in removing all the bubbles from the mixture as it began to cure.

The mold was placed in an oven at 100° C. for four hours to complete the cure. The sealant produced had a mild odor, a Shore A hardness of 22, and an elongation of 100.

A cured sealant sample was carefully weighed and placed in an oven for twenty four hours at 150° C. The sample lost 0.07 grams, corresponding to a 0.93 percent weight loss. The sample had a light yellow color and was not brittle. Shore A hardness was approximately 40. The sample still had a sulfurous odor.

EXAMPLE VII

Toluene Diisocyanate Cure of N-Dodecanethiol Polybutadiene Adduct, 20% Saturation Level 10.45 grams of the adduct prepared in Example III were mixed with 0.39 grams of toluene diisocyanate, poured into a two by two inch sheet mold, and cured at 100° C.

Cure required approximately 36 hours at 100° C. The sealant produced had a Shore A hardness of 15. The cured samples did not possess a sulfurous odor.

Two cured samples were carefully weighed and placed in a 150° C. oven for twenty four hours. Average weight loss was 0.14 grams, corresponding to a percentage weight loss of 1.97%. The samples displayed a darker brown color, but were not brittle. Their Shore A hardness was 37.

EXAMPLE VIII

Toluene Diisocyanate Cure of N-Dodecanethiol Polybutadiene Adduct, 10% Saturation Level 51.87 grams of the adduct prepared in Example IV were mixed with 2.52 grams of toluene diisocyanate, poured into a six by six inch sheet mold, and cured at 100° C. under degassing. Rapid curing resulted in some bubble entrapment.

Cure required approximately 2 hours. The sealant produced had a very mild, non-sulfurous odor, a Shore A hardness of 20, and an elongation of approximately 100.

A cured sealant sample was carefully weighed and placed in an oven for twenty four hours at 150° C. The sample lost 0.11 gram, corresponding to a 1.2% percent weight loss. The sample had yellowed slightly but was not brittle. Shore A hardness was 45.

EXAMPLE IX

Toluene Diisocyanate Cure of N-Dodecanethiol Polybutadiene Adduct 5% Saturation Level 44.25 grams of the adduct prepared in Example V were mixed with 2.38 grams of toluene diisocyanate, poured into a six by six inch sheet mold, degassed, and cured at 100° C.

Cure required approximately three hours. The sealant produced had a Shore A hardness of 22 and an elongation of approximately 150%. It did not possess a sulfurous odor.

A cured sealant sample was carefully weighed and placed in an oven for twenty four hours at 150° C. The sample lost 0.04 gram, corresponding to a 0.6 percent weight loss. The sample had yellowed but was not brittle. Shore A hardness was approximately 40.

The thermal stability of the cured sealant formulations of Examples VI through IX are summarized in TABLE I below. The first value is the value before the thermal stability test; the value in parentheses was obtained after the sealant had been exposed to 150° C. for twenty four hours.

TABLE I

| Sealant | Shore A Hardness | Elongation | % wt. change |
|---|---|---|---|
| Polybutadiene Control | 35 (45) | 100 (less than 10) | +0.7 |
| N—Butanethiol Adduct (28%) | 22 (40) | 100 (50) | −0.93 |
| N—Dodecanethiol Adduct | | | |
| 18% | 15 (37) | 100 (50) | −1.97 |
| 10% | 20 (45) | 100 (50) | −1.2 |
| 5% | 22 (40) | 150 (50) | −0.6 |

EXAMPLE X

Water Vapor Transmission Rate Determination

The formulations of Examples VII through IX, along with a polybutadiene control, were evaluated for their WVT properties:

TABLE II

| Formulation | WVT | Permeance | Permeability |
|---|---|---|---|
| Polybutadiene Control | 3.38 | 0.156 | 0.031 |
| N—Dodecanethiol Adduct | | | |
| 18% Saturation | 2.70 | 0.121 | 0.015 |
| 10% Saturation | 2.53 | 0.116 | 0.023 |
| 5% Saturation | 3.72 | 0.170 | 0.026 |

We claim:

1. A composition comprising the reaction product of (a) the addition reaction product of an unsaturated polymer, composed of at least one monomer which contains at least one carbon to carbon double bond, having terminal hydroxyl groups and 5 to 30 mole percent of an alkanethiol of from 8 to 20 carbon atoms wherein said alkanethiol is added to the double bonds of the unsaturated polymeric backbone, and (b) a polyisocyante compound or mixture of polyisocyanate compounds capable of curing said addition reaction product.

2. The composition of claim 1 wherein the polyisocyanate is selected from the group comprising ethylene diisocyanate, tetramethylene diisocyanate, hexamethylene diisocyanate, toluene diisocyanate, m-phenylene diisocyanate, p-phenylene diisocyanate, 4,4'-diphenylenemethane diisocyanate, and mixtures thereof.

3. The composition of claim 1 wherein the alkanethiol is selected from the group comprising n-octanethiol, n-dodecanethiol, tert-dodecanethiol, and eicosanethiol.

* * * * *